Dec. 19, 1967   C. W. MURRAY   3,358,542
ROTARY CROP SHEAR KNIVES AND THE LIKE
Original Filed Oct. 23, 1964   2 Sheets-Sheet 2

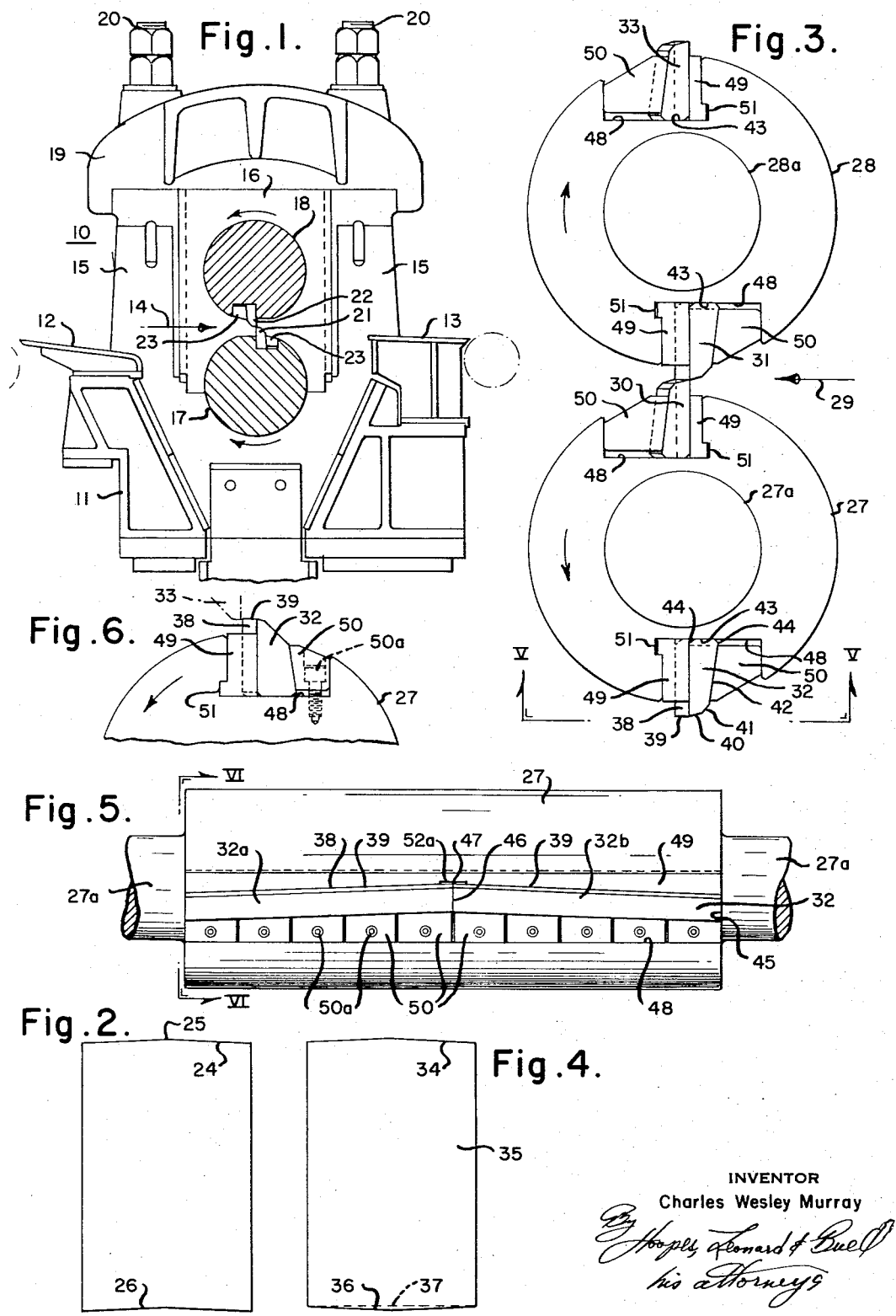

INVENTOR
Charles Wesley Murray
his Attorneys

United States Patent Office 3,358,542
Patented Dec. 19, 1967

3,358,542
ROTARY CROP SHEAR KNIVES AND THE LIKE
Charles Wesley Murray, Franklin Park, Pa., assignor to Heppenstall Company, Pittsburgh, Pa., a corporation of Pennsylvania
Original application Oct. 23, 1964, Ser. No. 406,112, now Patent No. 3,322,012, dated May 30, 1967. Divided and this application May 27, 1966, Ser. No. 553,404
9 Claims. (Cl. 83—673)

ABSTRACT OF THE DISCLOSURE

A rotary crop shear knife having two straight knife sections of right and left hand together forming a chevron in plan when the inner ends of said sections engage one another over their entire surfaces, each of said knife sections having a vertical operative face and an opposite support face tapering upwardly from the bottom a distance less than the operative face, a liner member abutting the operative face and a plurality of wedge members abutting the support face to hold the knife section between them.

---

This application is a division of my co-pending application Ser. No. 406,112, filed October 23, 1964, now Pat. No. 3,322,012.

This invention relates to rotary crop shear knives and the like which are chevron-shaped in plan having a continuous cutting edge which is straight along each leg of coacting chevron knife pairs. More particularly, this invention pertains to such knives made of substantially straight sections to abut at the apex of each chevron for mounting in drums and use as a rotary shear in the metal cutting field such as one requires in the steel industries.

Before rolling on hot mills in the steel industry, it is a common practice to crop at least the entry end of, for example, reduced slabs at work temperatures which may be in the order of 1500° F. and above prior to further rolling reduction of such work. For a long period, such entry end was cut square across with the result that the entire front edge of the cropped work normally was engaged at the same instant in the bite of the subsequent reducing roll mill stands. That produced unwanted shock on the rolls and their bearings and means were sought for more gradual entry of the work. Consequently, many mills more recently adopted the use of curved knives in the upper and lower drums of a rotary crop shear to produce a cropped work entry edge which was continuously convex from one side edge to the other in a forward direction. Such a curved entry edge entered the reducing rolls more gradually with the central portion of the entry edge ahead so that continued movement into the bite of the reducing rolls progressively caused the rolls to grip and reduce the work across its entire front edge and width. Each such curved knife, however, required special grinding machinery for the resharpening of the cutting edge thereof and often such resharpening had to be done in a city or at some central location removed from the site of the using mill. Moreover, extreme and difficult precision was required in grinding and in resharpening to provide the arc of the curve in each knife and so that a pair of knives would work together in the shear with the same clearance and overlap of the upper and lower cutting edges thereof. The difficulty was compounded when interchangeability was attempted among such curved knives of convex cutting edges and concave cutting edges, respectively. Still further, such curved knives were relatively heavy and thicker at the base to fit into the transverse recesses in their respective drums, where they were much more difficult to align and adjust.

The foregoing difficulties and disadvantages are overcome in rotary crop shears and the like using chevron knives with straight knife sections of this invention. Virtually every metal mill has apparatus which will readily sharpen straight cutting edges such as there are on the sections of each knife of this invention. Moreover, under this invention, a knife made of two or more sections, and chevron-shaped in plan when assembled, may be made relatively light and separate from the liner and any wedge plate on the respective transverse face of such sections. As a consequence, such liners and wedge plates become relatively permanent parts of the rotary crop shear apparatus leaving the knives themselves and their sections as a relatively lighter and less costly resharpenable and replaceable article of commerce. Still further, the knife section edges and faces being straight, whether or not transverse interlocking of the sections of a single knife is provided, makes the problem of alignment and adjustment of each chevron knife of this invention and each coacting pair of such knives very much simpler and easier. Embodiments of this invention produce a corresponding and continuous chevron-shaped entry edge on work being cropped so that upon such entry edge thereafter, entering a reducing mill, there are not only the advantages previously obtained by the use of curved entry edges, but additional ones.

Other objects, features and advantages of this invention will be apparent from the following description and the accompanying drawings, which are illustrative only, in which FIGURE 1 is a schematic side view of a rotary crop shear practice of this invention along a pass line in a metal mill;

FIGURE 2 illustrates a reduced slab of metal in which both the entry and rear ends thereof have been cropped by the shear of FIGURE 1;

FIGURE 3 is a somewhat enlarged end view of a modified embodiment in which each drum mounts a pair of chevron knives of this invention;

FIGURE 4 illustrates work which has been cropped at the entry end by one set of the knives in FIGURE 3 and at the rear end by the other set;

FIGURE 5 is a plan view of an exterior chevron knife of this invention taken along line V—V of FIGURE 3;

FIGURE 6 is a somewhat enlarged view of a portion of the knife assembly shown in FIGURE 5 viewed in the direction of line VI—VI;

Figure 9:
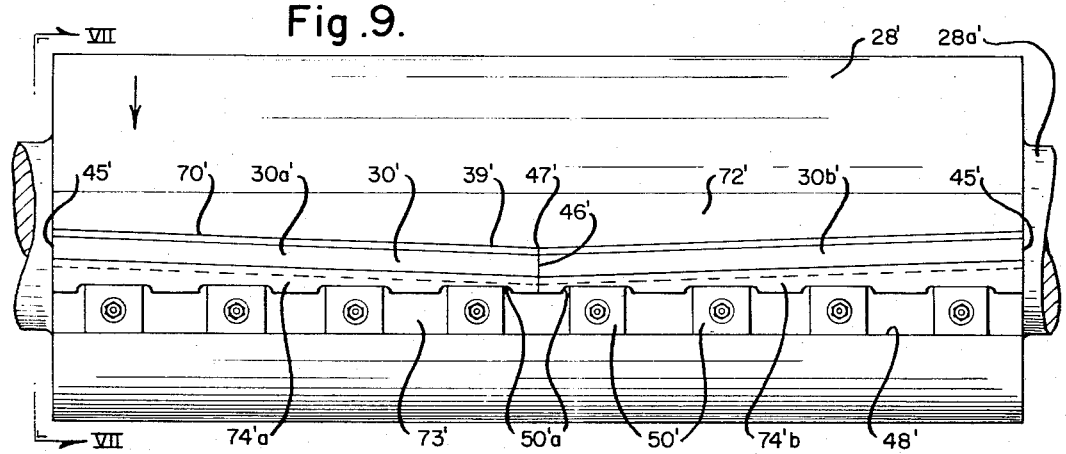
FIGURE 9 is a plan view of the upper knife and drum of FIGURE 7 taken in the position shown along line IX—IX of FIGURE 7.
Figure 8:
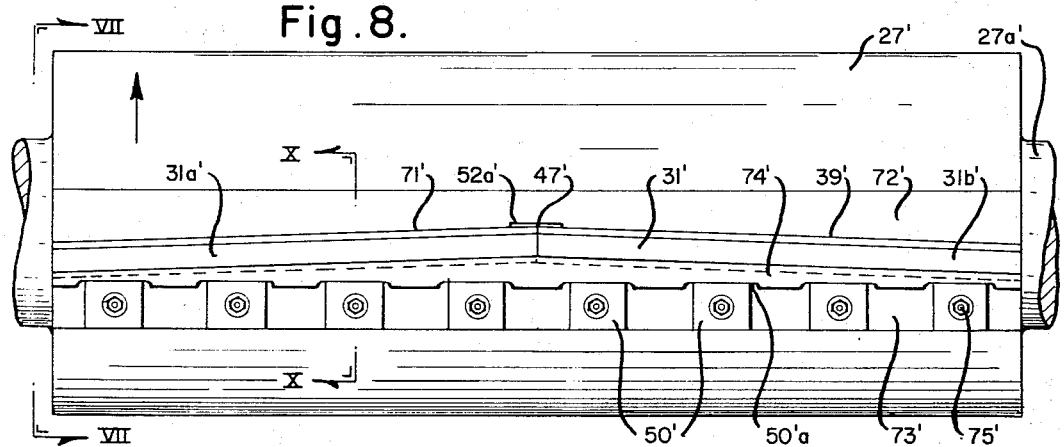
FIGURE 8 is a plan view of the lower knife and drum of FIGURE 7 taken in the position shown along line VIII—VIII of FIGURE 7.
Figure 7:
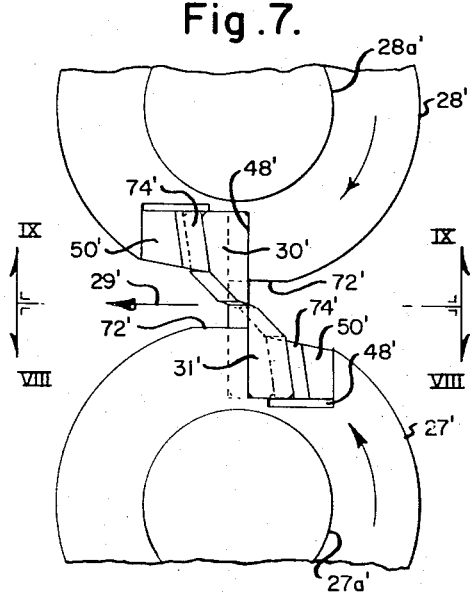
FIGURE 7 is a schematic view from the end of a set of chevron knives of this invention comprising another practice of this invention.

A stand 10 which may be used for a rotary crop shear of this invention is schematically illustrated in FIGURE 1. Therein, there is a foundation 11, an entry roller table 12 and an exit roller table 13. The stand has pairs of upright longitudinally spaced columns 15 to each side of a pass line indicated by the arrow 14 to hold bearings 16 therebetween respectively for the journal ends of a lower knife drum 17 and an upper knife drum 18. The columns 15 on each side are connected by a cap 19 and screw members 20 are utilized for vertical adjustment movement of the respective bearings on each side to fix the selected spacing of the axes of drums 17 and 18. The drums 17 and 18 are shown in vertical longitudinal section through the middle of each for purposes of better illustration. Any conventional drive may be used for the ends of the drums, usually under the control of sensing and response mechanism to effect automatic cropping of metal work passing along the pass line 14.

If it be assumed that lower knife 21 is an interior chevron-shaped knife and upper knife 22 is an exterior chevron-shaped knife held in place by respective wedges 23, the entry end of work, such as a hot reduced slab passing along pass line 14 in the direction of the arrow, will have its leading end cropped to form a shallow gable 24 which is a continuous flat entry edge from one side to the other peaking at the center 25 in a practice of this invention without there being any tear, or the formation of any bend or teat. And, if the drums continue to be or are turned again in the direction of the respective arrows in order to crop the rear end of such a slab, the cut produced will be as shown at 26. At times it may not be desired to shear or crop the rear end of a slab, strip or plate, although the entry end is.

An alternative form, which also shows chevron knives in the invention in more detail, is illustrated in FIGURES 3 to 6, inclusive. Therein, a lower drum 27 and an upper drum 28 comprise double knife drums to operate on work moving along a pass line 29 in the direction of the arrow. Thus, a lower knife 30 in drum 27 coacts with its companion upper knife 31 in drum 28 to shear metal. Rotation of those drums in the direction of the indicated arrows after rotation brings a second knife 32 in drum 27 into shearing coaction on a work piece with a second upper knife 33. Knives 30 and 31 form a shallow gable entry edge 34 on work 35 passing therebetween while knives 32 and 33 form a like oppositely pointed edge 36 on the other end as the work 35 leaves on the exit side of the bite of the drums. More often, it is preferred that a second set of coacting knives when used to shear the rear end of work 35 do so straight across as shown by the dotted line 37, in which case the knives 32 and 33 would not be chevron-shaped knives of this invention.

One form of coacting chevron knife, e.g., the knife 32, is illustrated in more detail in FIGURES 5 and 6. It is fixed in position in drum 27 so as to extend from one end of the drum body to the other between the bearing journals 27a for that drum. Knife 32 comprises two straight sections 32a and 32b. Each section has a generally vertical straight operative face 38, a straight cutting edge 39 along the outer transverse edge of that, a compound bevel face 40 and 41 on the top thereof, an outwardly tapering support face 42 on the side opposite to face 38 and a bottom face 43. If desired, the bottom edges may be chamfered at 44. Each section also has an outer end face 45 and an inner end face 46.

Preferably, there are two sections in each knife which, when the inner ends 46 are abutted preferably over their entire surfaces, form a chevron shape. If one knife, such as knife 32, in a coacting set of two knives respectively in the two drums, is an exterior chevron with the operative faces 38 forming an exterior angle in a shallow gable, or plow, shape when viewed in plan, the coacting chevron knife, such as knife 33, will have its operative faces form an interior angle in a shallow inverted gable, or trough, relation, as may be seen in the plan view in FIGURE 9 of an interior chevron-shaped knife on this invention. In the schematic FIGURE 1, knife 21 is an interior chevron knife and knife 22 is an exterior chevron knife; in FIGURE 3, knives 31 and 32 are exterior chevron knives while their respective coacting knives 30 and 33 are interior chevrons. In the drawing embodiments, each knife comprises two sections but it is evident that each knife may be made of a greater number of straight sections.

It has been discovered that the cutting edge 39 does not gap at its apex 47 when the sections 32a and 32b are abutted and held rigidly in place in a transverse drum groove 48. Such is also the case for the interior chevron knives as well as for the other exterior chevron knives, which are fixed similarly in identical grooves. As a consequence, there is no break in the continuity of the cutting edge of a chevron knife, such as cutting edge 39, and the cut through the work piece is correspondingly smooth. Moreover, in a gable cut to form entry edges such as edges 24 or 34, the cutting begins at the peak exactly midway between the edges and continues toward each side simultaneously, preferably, for uniform and progressive cutting action to form the entry ends, at least, of the slabs, plates or strips being so cropped by a practice of this invention. Further, each of the sections of such chevron knives is straight in the sense that each face and each edge of each section is straight from one end of a section to the other. Consequently, the knives may be readily removed during a mill down turn by the removal of such sections, if sharpening, or replacement is required. Sharpening and resharpening may be performed on conventional sharpening equipment usually at hand in a mill, rather than requiring shipment to some distant point. Moreover, corresponding sections of exterior chevron knives of the same size will normally be interchangeable in a particular mill, as will corresponding sections of interior chevron knives. In the cropping of reduced hot mill slab, the apex of an interior or exterior cutting edge may be about three-quarters of one inch distant from a straight line joining the outer ends of the cutting edge at the respective outer faces of the component sections thereof for larger mills; and less, say $5/16''$, for narrower mill, say 45-inch, having narrower knives and drums.

Preferably, each groove 48 is generally channel shaped in cross section with straight surfaces and open ends for ease of machining it out from one end of the drum body to the other to accommodate the chevron knife itself, an operative face liner 49 and wedges 50 to fix each knife rigidly in place in its respective groove when the wedges are tightened in place by cap bolts 50a. Channel 48 may be undercut at 51 to accommodate a bottom flange along the outer bottom edge of liner 49, or such may be omitted. The inside of liner 49 preferably is notched at 52a, the notch 52a reducing the precision otherwise required in the manufacture of liner 49 to permit the usual transverse adjustment of one knife in one of the drums to line it up with its coacting knife in the other drum and with the center of the pass line, as will be understood. The inner surface of liner 49 conforms to the operative face of the chevron-shaped knife, whether an exterior knife as shown or an interior chevron. The outer radial face of a liner 49 is straight to abut the straight side of recess 48. Similarly, the inner faces of the wedges 50 conform to the shape of the opposite face 42 of the chevron-shaped knife sections engaged by it. The inner faces of the wedges 50 have an upward taper to slope so as to lock the chevron-shaped knife with its bottom, such as bottom 43, against the bottom of its groove 48. Such wedges may have transversely elongated openings through which studs extend for engagement by nuts to hold the chevron knife fixed in place and locked against radially outward movement by the wedges. When the cutting edge becomes worn down, its respective sections after resharpening may be correspondingly raised by putting shims in the usual manner between the bottom of the groove 48 and the bottoms 43 of the knife sections themselves. Preferably, the sections of any chevron-shaped knife, whether an interior or exterior chevron, are positively interlocked against transverse separation at the center so that the inner end faces 46 remain abutted throughout, e.g., if desired, by providing an axial taper from the inner end of each section such as the sections 32a and 32b toward the outer ends thereof, respectively, will provide a transverse or axial lock of the knife with the liner and wedges. Thus, in a normal size rotary crop shear, if the width of end 46 in each section between operative face 38 and supporting face 42 is made $1/8''$ more than the corresponding width of its end face 45, the liner and wedge mounting elements being shaped conformably, the chevron knife sections when fixed in place are in a positive lock against both radial and transverse movement. In general, it is not necessary to provide the axial taper to prevent transverse separation inasmuch as the lateral friction when the knife is fixed in place is so great as to be sufficient, in which situation the transverse edges of the operative and support faces, e.g. 38 and 42, would normally be made parallel. Moreover, a further advantage of this invention is that the chevron-shaped knives, such as exterior chevron knife 32 and its coacting interior chevron knife 33, have relatively smaller mass inasmuch as the liners therefor are preferably separate and substantially permanent parts. Such smaller mass reduces cost of replacement and handling and also facilitates insertion and removal of the knife sections from the drums because of their lighter weight for the same shearing strength and service. It will also be noted that the chevron-shaped cutting edges of a pair of coacting chevron knives of this invention preferably intersect a plane through the axes of their mounting drums midway between apices of the cutting edges, on the one hand, and the outer ends of those cutting edges, on the other hand, when the bottoms of the knife groove, e.g. 48, and the knife sections are substantially normal to such plane. Cutting of metal work is accomplished by the progressive movement of the coacting cutting edges past each other as indicated schematically in FIGURES 6 and 10, the distance between operative faces of a coacting pair of knives, e.g., 30 and 31, in the case of cropping of steel slabs being generally in the order of $1/16''$ and the radial overlap between cutting edges of the coacting knives being in the order of $1/8''$, such overlap extending about $1/16''$ above and below the horizontal pass line plane. Neither the cutting edges nor the operative faces of the coacting knives desirably ever come into contact one with the other when they are properly adjusted and aligned for most effective metal shearing purposes. Preferably, in the cropping of the entry end of a slab 35 moving along line 29, the uncropped leading edge would ride up on the top of the leading knife 30, become engaged also by traveling knife 31 prior to passing through the bite position partially illustrated in FIGURE 3 so that upon completion of the cropping, the newly formed entry edge 34 of the slab would fall by gravity behind the operative face of interior chevron knife 30, which has its cutting edge above the top of its liner 49 sufficient so that slab 35 drops clear of upper knife 31.

In FIGURES 7 to 10, inclusive, exterior and interior chevron-shaped knives of this invention for cropping, shearing and/or other metal cutting are shown in another alternative form of mounting on rotatable drums with, moreover, the work passing along a pass line in which the knife on the upper drum leads through the bite of the drums and knives. No change in principle is involved and the figures in question illustrate that there are a variety of modes of applying the invention and that the drums can be rocked or rotated in either direction to cut in accordance with the design and/or an operator's preference. In the illustrations of FIGURES 7 to 10, inclusive, parts corresponding generally in structure and in function to parts shown in the embodiment of FIGURES 3 to 6, inclusive, are provided with the same reference numerals with the addition of a prime accent thereto. Moreover, the numbering in FIGURES 7 to 10 follows the numbering of the pairs of knives 30–31 inasmuch as those knives form the peripheral shallow gable entry end cut as do the knives shown in FIGURES 7 to 10, inclusive. The structure and mounting of knife 31 is identical to the structure and mounting of the knife 32 in the immediately preceding described embodiment. Further, inasmuch as FIGURE 9 shows an interior chevron knife 30' in plan in the upper drum 28', the description herein thereof supplements the foregoing description regarding the construction and functioning of the interior chevron 30 and 33 in the immediately preceding embodiment.

Interior chevron-shaped knife 30' has its two-section continuous cutting edge 39' in shallow invert gable, or trough, shape in plan. Moreover, each knife section 30a' and 30b' has its inner end 45', which abut each other over their entire surface, the same width as its outer end 45', there being no axial taper in knives 30' and 31' and thus no transverse positive locking, reliance against lateral separation being placed on the great frictional binding of the sections of the knife by the mounting thereof in drum 28'. Such mounting, moreover, is in a shaped groove 48' in the case both of interior chevron 30' and in the case of exterior chevron 31'; that is to say, the respective grooves 48' in drums 27' and 28' each incorporate a shallow V-shaped surface 70' and 71' respectively abutting the operative faces 38' of the knives 30' and 31'. Such upright side 70' is therefore in the form of a shallow gable in plan to fit the shallow trough of the operative face of knife 30' on the one hand, and in side 71' in the form of a shallow trough to fit the shallow gable of the operative face of knife 31'. In this way, the liners 49 in a sense are in the embodiment of FIGURE 7 integral with the respective drums 28' and 27', although separate liners may be provided if desired. Such drums have tangential flat portion at 72' adjoining the respective operative faces of their chevron knives for clearance of work in passing through the bite of the drums during operation. In such movement of work along pass line 29', the waste front cropped-off end of the work is the portion that drops onto the lower flat 72' upon completion of the cropping since the material with its freshly shaped entry end will continue to ride up on the back of knife 31' during operation until knife 31' has turned sufficiently far in the direction of the arrow indicated on its drum 27' to pass out of engagement with such cropped work, which is also clear of the upper drum.

Figure 10:
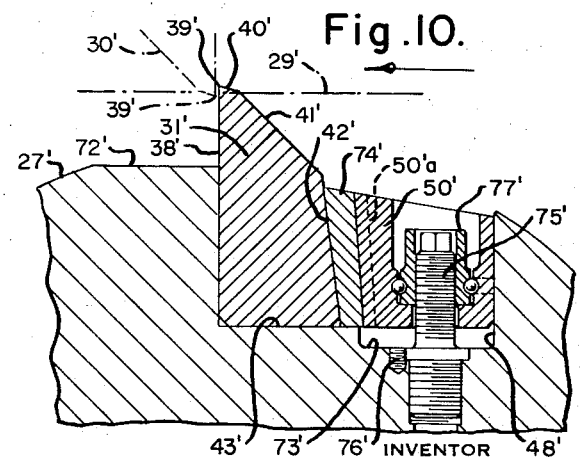
FIGURE 10 is a detailed and enlarged view in cross section somewhat enlarged taken along line X—X of FIGURE 8.

As shown more fully in FIGURE 10, the bottom surface 73' of each groove 48' is stepped, the higher step radially in distance from the axis of drum 27' furnishing support for the bottom 43' of the chevron knife sections and for a wedge plate 74'. Each wedge plate 74' may be in one piece or have sections 74'a and 74'b which on their inner upright faces conform to the slope of the support faces 42' of the respective knife sections. On their opposite face, the wedge plate especially when in sections may be provided with bays 50'a to prevent lateral movement and be engaged by the wedges 50'. In this way, the wedges 50' in the embodiment being described may be made of a uniform size as compared with the change in size of the wedges 50 used in the immediately above-described embodiment wherein the wedges are thicker in a peripheral direction in the center of the drum where they are holding an exterior chevron knife and peripherally thicker at the outer ends where they are holding an interior chevron knife. Each wedge 50' is vertically drilled and counterbored for passage thereinto of the upper end of a threaded stud 75'. The lower end of such stud is threadably fixed in the drum in the bottom of groove 48', and locked in place by a set screw 76'. A collar nut 77' threadably engages the upper stem of stud 75' to press its wedge 50' into engagement with its respective wedge plate 74' to lock its respective knife in fixed position in its respective drum.

Various changes may be made in details of the illustrated embodiments and in the mounting of the sectional chevron-shaped straight knives of this invention and in the shapes of the shallow angle cuts made by such knives and in the direction of rotation of their mounting drums, and other embodiments may be provided, without departing from the spirit of this invention, which is not to be limited except by the claims hereof, or the scope of the appended claims.

What is claimed is:

1. A rotary crop shear knife and the like for hot metal work for insertion in a groove having parallel sides in a rotatable drum, comprising, in combination, two straight knife sections of right and left hand together forming a chevron in plan when the inner ends of said sections engage one another over their entire surfaces, each of said sections having transverse planar faces and transverse straight edges, each section having a generally vertical operative face forming one side, a straight cutting edge comprising the outer transverse edge of said operative face, an opposite support face tapering upwardly from the bottom generally toward said operative face, the height of said operative face being greater than the height of said support face, a compound bevel face extending downwardly from said cutting edge in a direction away from said operative face to the top edge of said support face, a bottom face extending between the bottom edges of said operative and support faces, the inner end of each section being planar and at an angle to said operative face equal to one-half the included angle of said chevron, a liner member having a straight planar face and a spaced chevron face against which the operative faces of the sections bear and a plurality of wedge members adapted to bear on the support face and one side of the groove.

2. A rotary crop shear knife and the like for hot metal work, comprising, in combination, two straight knife sections of right and left hand together forming a chevron in plan when the inner ends of said sections engage one another over their entire surfaces, each of said sections having transverse planar faces and transverse straight edges, each section having a generally vertical operative face forming one side, a straight cutting edge comprising the outer transverse edge of said operative face, an opposite support face tapering upwardly from the bottom generally toward said operative face, the height of said operative face being greater than the height of said support face, a compound bevel face extending downwardly from said cutting edge in a direction away from said operative face to the top edge of said support face, a bottom face extending between the bottom edges of said operative and support faces, the inner end of each section being planar and at an angle to said operative face equal to one-half the included angle of said chevron, said inner end of each section having a dimension extending between the operative and support faces which is slightly greater than the corresponding dimension at the outer end of said section to provide a lateral taper in each section from the inner end toward the outer end thereof, whereby when said knife is fixed in a rotary drum, it will be locked in a positive manner against movement of the knife radially outwardly and each section will be locked in a positive manner against axial movement of each section laterally outwardly from the center of the knife.

3. A rotary crop shear knife and the like as set forth in claim 1, comprising, said operative faces of said sections of said knife forming an interior angle shaped like a shallow invert gable when viewed in plan.

4. A rotary crop shear knife and the like as set forth in claim 3, in which, the distance from a line joining the outer ends of the cutting edges of said section to the invert apex of said cutting edge at the inner ends of said sections is a distance which does not exceed about one inch.

5. A rotary crop shear knife and the like as set forth in claim 1, comprising, said operative faces of said sections of said knife forming an exterior angle shaped like a shallow gable when viewed in plan.

6. A rotary crop shear knife and the like as set forth in claim 5, in which, the distance from a line joining the outer ends of the cutting edges of said sections to the apex of said cutting edge at the inner ends of said sections is a distance which does not exceed about one inch.

7. A straight knife section of appropriate hand for a rotary shear knife and the like for hot metal work for insertion in a groove having parallel sides in a rotatable drum, adapted to form a chevron knife in plan with straight legs when the inner ends of two of said sections are abutted, said section having generally planar faces and straight edges, a generally vertical operative face forming one side, a straight cutting edge coincident with the outer transverse edge of said operative face, an opposite support face tapering upwardly and generally toward said operative face, the height of said operative face being greater than the height of said support face, a bevel extending downwardly from said cutting edge in a direction away from said operative face to the top of said support face, a bottom face joining the bottom edges of said operative and support faces, the inner end of each section being planar and at an angle to said operative face approaching a right angle, a liner member having a straight planar face bearing on one parallel side of the groove and a spaced chevron face against which the operative faces of the knife sections bear and a plurality of wedge members adapted to bear on the support face and the other parallel side of the groove and means holding said wedge members in place.

8. A straight knife section of appropriate hand for a rotary shear knife and the like for hot metal work, adapted to form a chevron knife in plan with straight legs when the inner ends of two of said sections are abutted, said section having generally planar faces and straight edges, a generally vertical operative face forming one side, a straight cutting edge coincident with the outer transverse edge of said operative face, an opposite support face tapering upwardly and generally toward said operative face, the height of said operative face being greater than the height of said support face, a bevel extending downwardly from said cutting edge in a direction away from said operative face to the top of said support face, a bottom face joining the bottom edges of said operative and support faces, the inner end of each section being planar and at an angle to said operative face approaching a right angle, the inner end of said section has a dimension extending between the operative and support faces which is slightly greater than the corresponding dimension at the outer end of said section to provide a lateral taper from the inner end to the outer end thereof, whereby when a chevron knife comprising a plurality of said sections is fixed in a drum, said section will be locked in a positive manner against radially and axially outward movement.

9. A shear knife and the like for metal work, comprising, in combination, a plurality of straight knife section of right and left hand together forming a chevron in plan when the inner ends of at least the two inmost of said sections abut, each of said sections having opposite operative and support faces and straight edges, each section having a straight cutting edge coincident with the outer transverse edge of said operative face, said sections together providing a chevron-shaped continuous cutting edge from one outermost end to the other, said operative and support faces tapering generally upwardly toward one another, the height of said cutting edge being greater than the height of said support face, said inner ends of said inmost sections being planar and at an angle equal to one-half the included angle of said cutting edge, and liner and wedge members conforming to the shape of said faces adapted to fix said knife rigidly in a transverse recess in a mounting device.

References Cited
UNITED STATES PATENTS

| | | | |
|---|---|---|---|
| 1,290,555 | 1/1919 | Heppes | 83—345 |
| 1,859,336 | 5/1932 | MacChesney et al. | 83—345 X |
| 2,221,022 | 11/1940 | Ellis | 83—345 X |
| 2,246,957 | 6/1941 | Shields | 83—345 X |
| 2,751,006 | 6/1956 | Lane | 83—674 |
| 2,805,715 | 9/1957 | Novick | 83—341 |

JAMES M. MEISTER, *Primary Examiner.*